Feb. 11, 1941. H. E. SLOAN ET AL 2,231,833
CHUCK
Filed Jan. 27, 1938 2 Sheets-Sheet 1
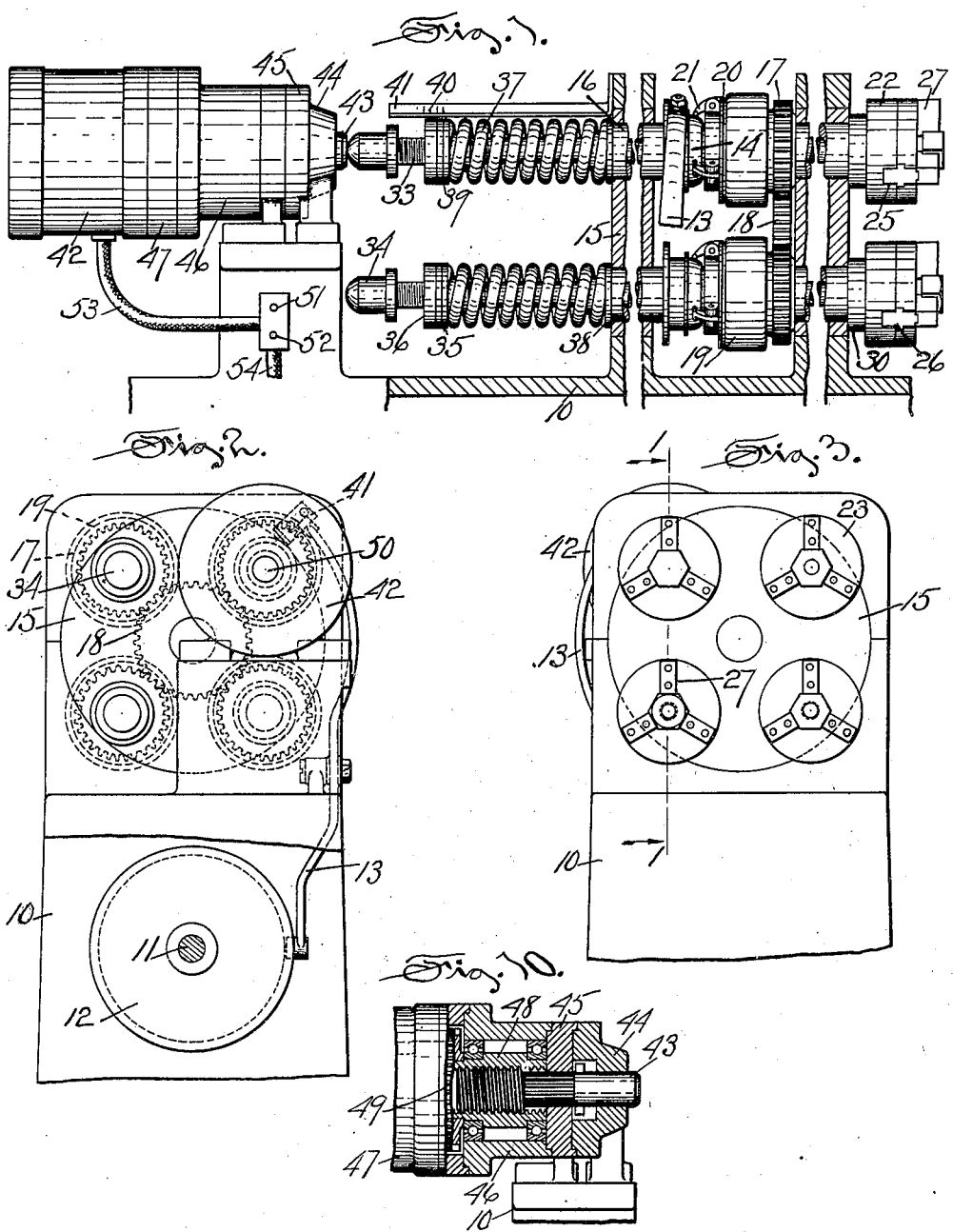

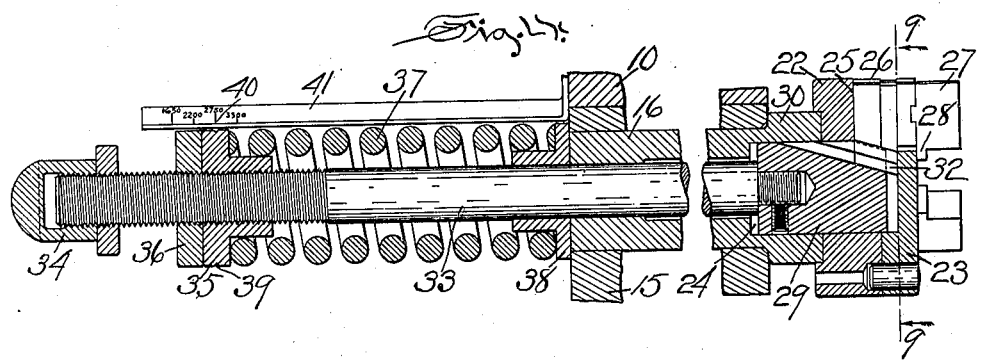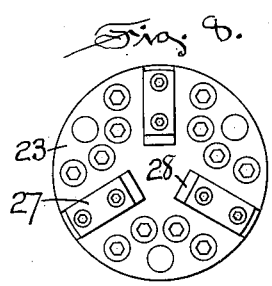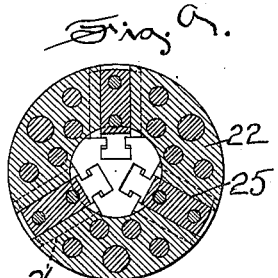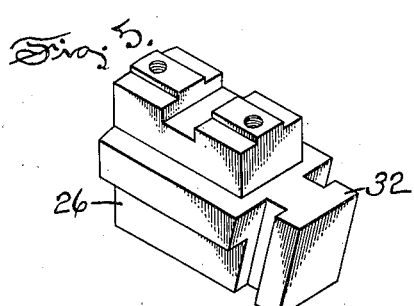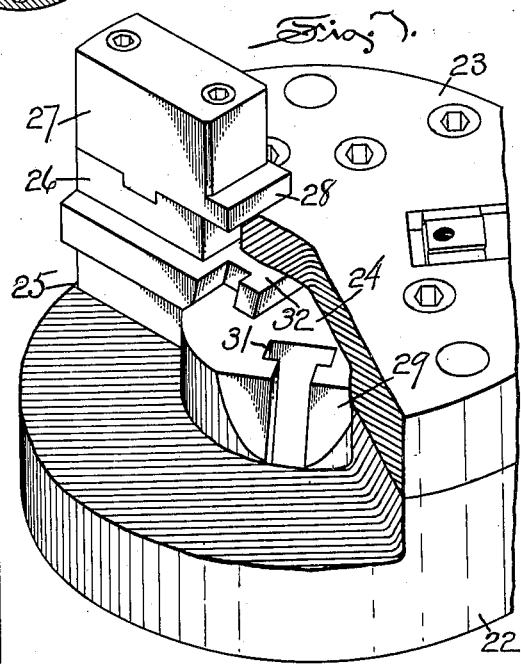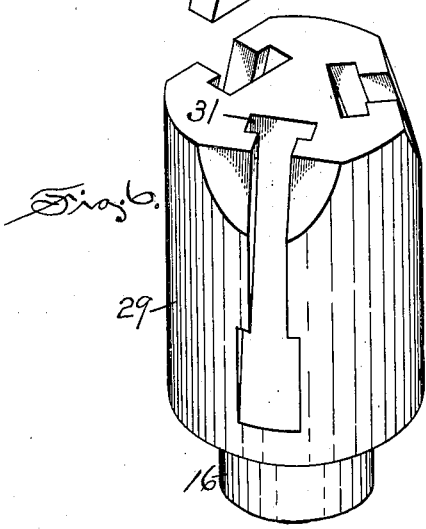

Patented Feb. 11, 1941

2,231,833

UNITED STATES PATENT OFFICE 2,231,833

CHUCK

Harry E. Sloan, Hartford, and George A. Highberg, West Hartford, Conn., assignors to The Cushman Chuck Company, Hartford, Conn., a corporation of Connecticut Application January 27, 1938, Serial No. 187,210

6 Claims. (Cl. 29—38)

Our invention relates to that class of chucks which are employed for holding pieces of work for operation thereon by tools of different kinds, and an object of our invention, among others, is the production of a chuck of this type that may be conveniently and readily operated in a rapid and efficient manner; and a further object of the invention is to provide a chuck of this type in which the force of the jaws may be graduated to suit any particular kind of work being held by said jaws.

One form of a chuck embodying our invention and in the construction and use of which the objects herein set out, as well as others, may be attained is illustrated in the accompanying drawings in which—

Figure 1 is a view in side elevation of a chuck actuating mechanism embodying our improved chuck with parts cut away to show construction on the dotted line 1—1 of Fig. 3.

Figure 2 is a view looking at one end.

Figure 3 is a view looking at the opposite end.

Figure 4 is a view on enlarged scale in axial section through the actuating mechanism for one of the jaws.

Figure 5 is an isometric perspective view on still further enlarged scale of one of the chuck jaws.

Figure 6 is a similar view of the chuck jaw actuator.

Figure 7 is another similar view showing the chuck body with parts broken away to show construction.

Figure 8 is a face view of the chuck on reduced scale.

Figure 9 is a view in section through the chuck body crosswise thereof on the dotted line 9—9 of Fig. 4.

Figure 10 is a detail view partially in section showing the mechanism for operating the push button.

In the accompanying drawings the numeral 10 denotes a turret supporting frame constructed in any suitable manner and having a cam shaft 11 connected to be driven from any suitable source of power. A cam 12 is secured to the shaft 11 this cam being formed to actuate a clutch lever 13 pivotally mounted on the frame with one end in engagement with the cam 12 and its opposite end being adapted to intermittently engage the cone 14 of a spindle actuating clutch. In the structure herein shown said cone has an annular groove in which a stud or roller on the end of the lever 13 is engaged each time said cone is brought into position for such engagement in a manner now to be described.

A carrier or turret 15 is rotatably mounted in the frame 10 and a plurality of chucks with their actuating mechanism are rotatably mounted in said carrier. To effect rotation of the chucks each chuck spindle 16 has a pinion 17 secured thereto, said pinion being in mesh with an actuating gear 18 mounted in the frame and continuously driven in any suitable manner, the driving connection not being shown herein as such is not necessary for a thorough understanding of the invention. In order that rotation of the spindles may cease for certain periods for the purpose of chucking operations clutches are employed, said clutches each comprising a drum 19 secured to the gear 17, said gear and drum being free to rotate on the spindle 16 independently thereof. Said clutch also comprises a clutch disk 20 secured to the spindle 16 and operated by clutch levers 21 pivotally attached to the disk and engaged with the clutch operating cone 14 hereinbefore referred to, said cone being splined to the spindle 16 for operation by the lever 13 as hereinbefore described.

A chuck body 22 is secured to the forward end of each of the spindles 16, each of the chucks comprising the chuck body being of similar construction and for which reason a description of one only will be given herein, such description to be taken as applying to each of the chucks. A face plate 23 is secured to the chuck body in any suitable manner, as by means of pins and screws, a chamber 24 extending within the chuck body and into the cap or face plate. Grooves 25 are formed in the chuck body, extending radially therein and chuck jaw carriers 26 are mounted for radial movement in said grooves in a manner that will be readily understood, chuck jaws 27 being secured to the carriers in any suitable manner, in the form herein shown, lips 28 on the forward end of the chuck jaws being adapted to seat pieces of work held between said jaws.

A jaw actuator 29 is mounted for endwise movement within the chuck body and within a head 30 on the end of the spindle 16, as shown in Fig. 4 of the drawings. Said actuator has dovetail shaped grooves 31 inclined in a radial direction in the actuator 29, said grooves being adapted to receive T-shaped tongues 32 on the ends of the jaw carriers 26 and as shown in Fig. 7 of the drawings. From this it will be seen that as the jaw actuator is moved lengthwise in the chamber 24 the jaw carriers and the chuck jaws thereon will be moved radially in or out on the chuck body, depending upon the direction of movement of said actuator. The actuator is secured to the end of a chuck jaw actuating rod 33 mounted for reciprocating movement within the spindle 16, an actuating button 34 being secured to the end of the rod opposite that end bearing the jaw actuator. A thrust bearing 35 is adjustably secured to the rod 33 and may be held in any desired position as by means of a lock nut 36. A spring 37 is mounted on the rod 33, one end of the spring abutting against an anchoring plate 38 supported against the rear end of the spindle 16.

A graduation mark 39 is formed on the thrust bearing 35, preferably extending around said bearing and acting in connection with graduations 40 on a graduation bar 41 to determine the pressure of the spring 37 when the thrust bearing is positioned by means of the interengaging threads on said bearing and rod 33. In this manner the force exerted by the spring 37 to close the jaws 27 may be determined so that injury to pieces of work held by the jaws will not be caused.

A motor 42 is mounted on the frame 10 in any suitable manner, said motor comprising an actuating plunger 43 extending out at one end thereof opposite the path of movement of the buttons 34 on the rods 33 when the latter are revolved about the axis of the carrier. Any suitable means as a Geneva movement or other mechanism for imparting a step-by-step rotating movement to the carrier may be employed, such means being common to machines of this type and being of general knowledge to those skilled in the art and therefore not being shown herein, as it is not necessary for a full understanding of the present invention, it being sufficient to state it should be understood that the carrier is rotated to bring the chucks periodically into operative positions. The plunger 43 is splined for lengthwise movement in a cap 44 on a plate 45 secured to a case 46 at the front end of a gear case 47 attached to the front end of the motor 42. The cap 44 and case 46 are firmly secured to the top of a pedestal extending upwardly from the frame, as shown in Fig. 1, and the case 60 and the motor are supported by said pedestal through the medium of the cap 44 and case 46. A feed nut 48 is rotatably mounted in the case 46, the threaded opening of said nut meshing with threads on the inner end of the plunger 43, as shown in Fig. 10 of the drawings. A feed gear 49 is secured to the feed nut 48 to rotate it, the gear being connected by a set of connecting gears with the shaft 50 of the motor, such connection not being shown herein, as it is not necessary for a full understanding of the invention. Operation of the motor is effected as by means of push buttons 51—52 placed in a position convenient of access to the operator of the machine. These buttons are connected as by means of a cable 53 with the motor for effecting its operation and by a cable 54 with a suitable source of power.

In the operation of this mechanism the chucks are periodically positioned by rotation of the carrier to present a piece of work held by a chuck in positions for operation by tools in a manner that will be readily understood. This positioning of the chucks is obtained by a step-by-step movement of the carrier and in such movement each chuck is presented in a certain position for a chucking operation while a tool is operating upon a piece of work held by another chuck. At this chucking station a button 34 is positioned in the line of movement of the actuating plunger 43 and at this time the motor is caused to operate in one direction, as by means of a switch operated by one of the push buttons 51 or 52 to actuate the plunger and push it against a button 34. This will operate the chuck jaws to release a piece of work. Operation of the other push button 51 or 52 will cause operation of the motor and hence of the nut 48 in an opposite direction to release a button 34 and permit the spring 37 to close the jaws upon a piece of work after which the operation may be repeated.

In accordance with the provisions of the patent statutes we have described the principles of operation of our invention, together with the device which we now consider to represent the best embodiment thereof; but we desire to have it understood that the device shown is only illustrative and that the invention may be carried out by other means and applied to uses other than those above set out.

We claim:

1. A chuck mechanism including a chuck body having a cylindrical chamber extending therethrough, chuck jaws radially movable on said body and having T-shaped tongues extending from their inner ends into said chuck diagonally to the axis thereof, a chuck jaw operating head of generally cylindrical shape and squared at its outer end and slidably fitted within said chamber and having T-shaped grooves of reverse form to those of said tongues to receive the latter, said grooves cutting across the outer corner of said head with one end of each groove opening out at the end of the head and the opposite end of each groove opening out on the cylindrical side surface of said head, and means for operating said head.

2. A chuck mechanism including a chuck body having a cylindrical chamber extending therethrough, a chuck spindle to which said body is secured, said spindle having a chamber of the same size as the opening through the chuck body and registering therewith, chuck jaws radially movable on said body and having T-shaped tongues extending from their inner ends into said chamber diagonally to the axis thereof, a chuck jaw operating head of generally cylindrical shape and fitting within the opening in the chuck body and within said chamber, said head being squared at its outer end and having diagonally extending T-shaped grooves of reverse form to those of said tongues to receive said tongues, said grooves extending from the squared end of the head and opening out on the side cylindrical surface thereof, a chuck jaw operating rod secured to said head, and means for operating said rod.

3. A chucking mechanism including a frame, an intermittently rotatably mounted carrier supported in said frame, a plurality of chuck actuating mechanisms including chucks mounted on said carrier each of said mechanisms also including a non-rotatable reciprocating chuck actuating rod, a pedestal supported by said frame, a case secured to said pedestal back of the plane of revolution of the rear ends of said rods, a motor secured to the back of said case, a non-rotatable actuating plunger projecting from said case in line with each of said rods when the latter are at rest, means within said case to contact said plunger with said rods to transmit the lengthwise movement of said plunger directly to said rods to operate them, and connecting mechanism within said case to connect said plunger with said motor.

4. A chucking mechanism including a frame, an intermittently rotatably mounted carrier supported in said frame, a plurality of chuck actuating mechanisms including chucks mounted on said carrier and each of said mechanisms also including non-rotatable reciprocating chuck actuating rod, a gear case secured to said frame back of the plane of revolution of the rear ends of said rods, a motor secured to the back of said case, a non-rotatable actuating plunger projecting from said case in line with said rods when the latter are at rest, and a geared connection mechanism within said case between said motor and said plunger for operation of the latter to directly contact said rod and thereby transmit its lengthwise movement directly to the rod to move the latter to the same extent.

5. A chucking mechanism including a frame, an intermittently rotatably mounted carrier supported in said frame, a plurality of chuck actuating mechanisms including chucks mounted on said carrier and each of said mechanisms also including non-rotatable reciprocating chuck actuating rod, a plate rigidly secured to said frame, a gear case rigidly connected with said plate, a motor rigidly supported by said gear case, a non-rotatable actuating plunger mounted for reciprocating movement in said plate and gear case, and a geared actuating mechanism in said case connecting said motor with said plunger for operation of the latter to directly contact said rod and thereby transmit its lengthwise movement directly to the rod to move the latter to the same extent.

6. A chucking mechanism including a frame, an intermittently rotatably mounted carrier supported on said frame, a chuck actuating mechanism including a chuck mounted on said carrier and also including a reciprocating chuck actuating rod, a spring mounted on a projecting end of said rod, means threadedly engaged with said rod for adjusting the tension of said spring, a graduated member extending from said frame to cooperate with an index on said tension adjusting means, a plunger engageable with the end of said rod for operating the latter, and means for operating said plunger.

HARRY E. SLOAN.
GEORGE A. HIGHBERG.